United States Patent [19]
Larson

[11] 3,874,609
[45] Apr. 1, 1975

[54] BALE UNROLLER

[76] Inventor: Irving R. Larson, 524 Illinois St., Salem, Oreg. 97301

[22] Filed: Nov. 8, 1973

[21] Appl. No.: 413,910

[52] U.S. Cl. ........................ 242/86.5 R, 214/83.36
[51] Int. Cl. ...................... B65h 75/40, B60p 1/38
[58] Field of Search ............ 242/86.5 R; 214/83.36

[56] References Cited
UNITED STATES PATENTS

| | | | |
|---|---|---|---|
| 2,591,556 | 4/1952 | Knutson | 214/83.36 |
| 2,808,949 | 10/1957 | Dickey | 214/83.36 |
| 3,051,298 | 8/1962 | Knight | 214/83.36 |
| 3,159,296 | 12/1964 | Schuitemaker | 214/83.36 X |

*Primary Examiner*—Edward J. McCarthy
*Attorney, Agent, or Firm*—Klarquist, Sparkman, Campbell, Leigh, Hall & Whinston

[57] ABSTRACT

A bale unroller comprises a trailer including a frame having end plates, side gates therebetween, and a conveyor belt upon which a horizontally disposed, rolled hay bale may be received. The side gates act as retaining members and are spaced above the end of the conveyor for allowing exit of hay while restraining the horizontal movement of the bale as a whole. The conveyor is operated for rotating the bale whereby a band of hay is unrolled under a side gate, providing a narrow swath of hay along the path of the trailer as the hay breaks off at the end of the conveyor.

10 Claims, 5 Drawing Figures

3,874,609

BALE UNROLLER

BACKGROUND OF THE INVENTION

The present invention relates to a bale unroller and particularly to an unroller for distributing large, rolled bales of hay.

Recent developments have made possible large cylindrical bales of hay which are rolled as the hay is gathered from the ground. These bales are compact and large, weighing, for example, from 1500 to 3000 pounds, facilitating the gathering and shipment of large quantities of hay.

The bales are advantageously employed in the feeding of livestock since the bales in horizontal position tend to shed water in the manner of a thatched roof. The bale may be left in the open or in a feeding enclosure accessible to livestock.

However, for many purposes it is advantageous to redistribute the hay in ration form, as for winter feeding on the western range. While it is possible to separate and distribute the packed and rolled hay bale manually, the bale is quite unweildy and such operation is laborious and time consuming.

SUMMARY OF THE INVENTION

According to the present invention, apparatus for distributing a rolled, substantially cylindrical bale of hay comprises a frame for receiving the bale in an axis horizontal position. A floor member for sustaining the weight of the bale comprises a conveyor belt having a width approximately as long as the longitudinal length of the bale whereby hay will not be separated and lost beneath the apparatus. The conveyor belt has a concave cross section where the bale is supported, tending to facilitate bale rotation while keeping the bale within the aforementioned frame. The frame may also include side gates for restraining translation of the bale as a whole. A side gate is suitably spaced from an exit portion of the conveyor belt so that a band of hay may be unrolled from the bale under the gate as the conveyor belt produces a rotary motion of the bale. As the apparatus is transported over the ground, portions of the bale break off at the exit end of the conveyor belt to provide a swath of hay along the path of the apparatus for thereby producing the desired distribution.

It is accordingly an object of the present invention to provide improved apparatus for distributing hay or a similar material over a wide area.

It is another object of the present invention to provide an improved bale unroller for distributing large, rolled, cylindrical bales of hay.

It is a further object of the present invention to provide an improved bale unroller for distributing cylindrical bales, which unroller is economical in construction and simple in operation.

It is another object of the present invention to provide an improved bale unroller which is substantially automatic, thereby reducing the labor and time involved in distributing hay.

It is another object of the present invention to provide an improved bale unroller for distributing hay over a wide area while such unroller is in motion.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

DETAILED DESCRIPTION

Figure 1:
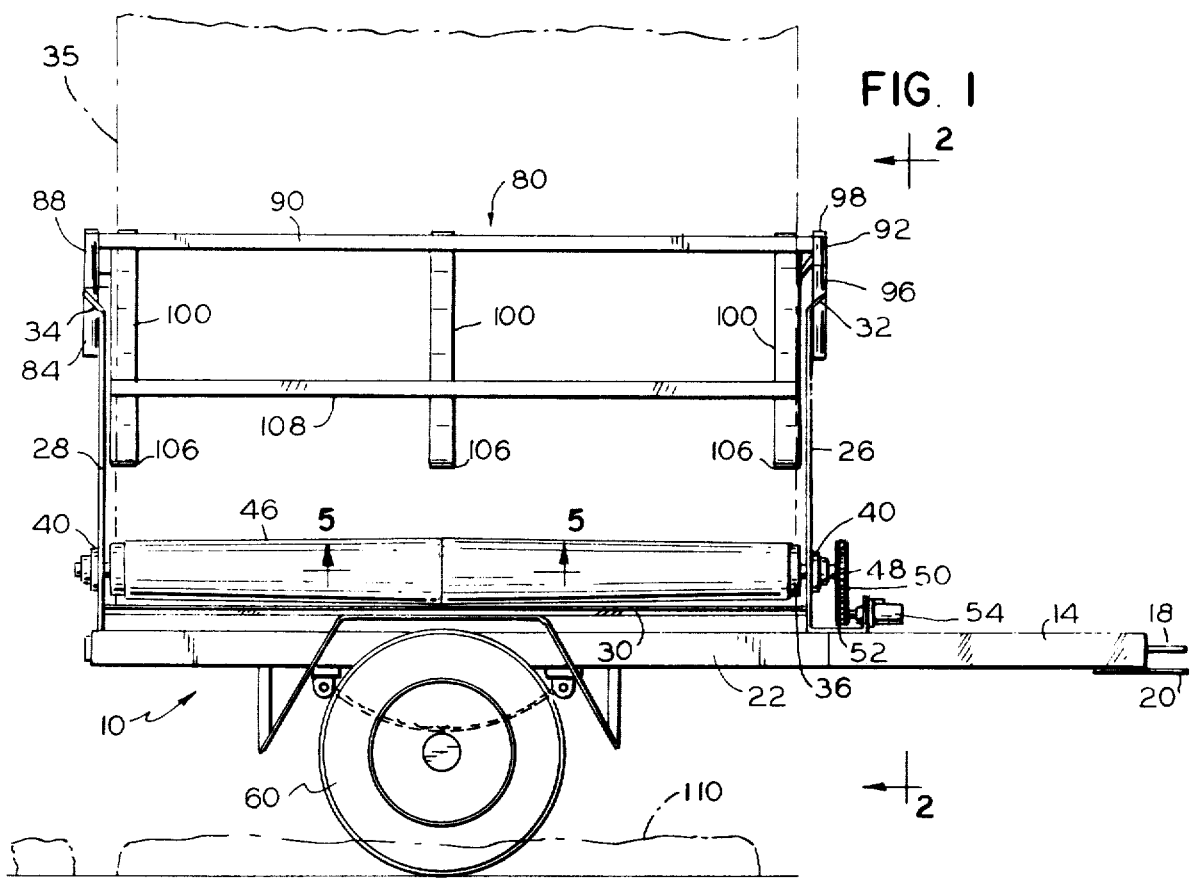
FIG. 1 is a side view of a bale unroller according to the present invention.
Figure 2:
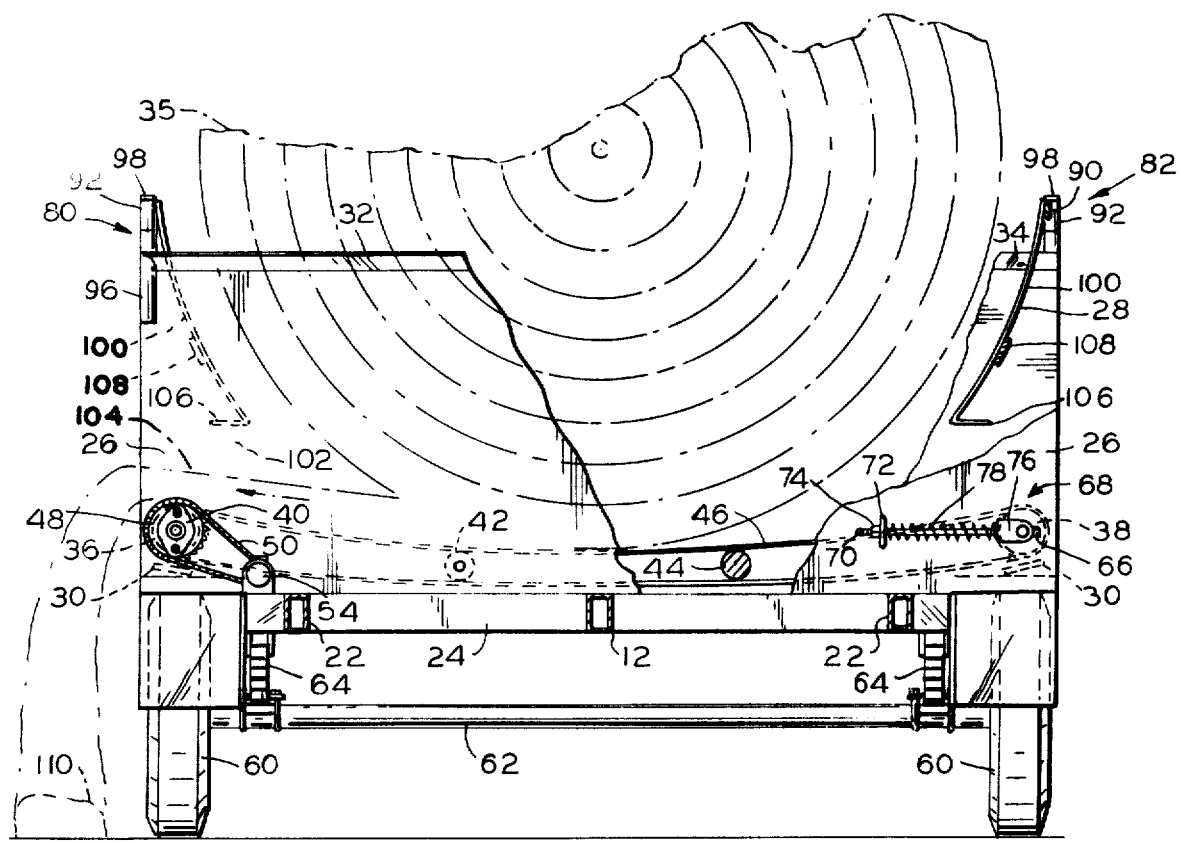
FIG. 2 is a front view, partially broken away, of such bale unroller as taken at 2—2 in FIG. 1.
Figure 3:
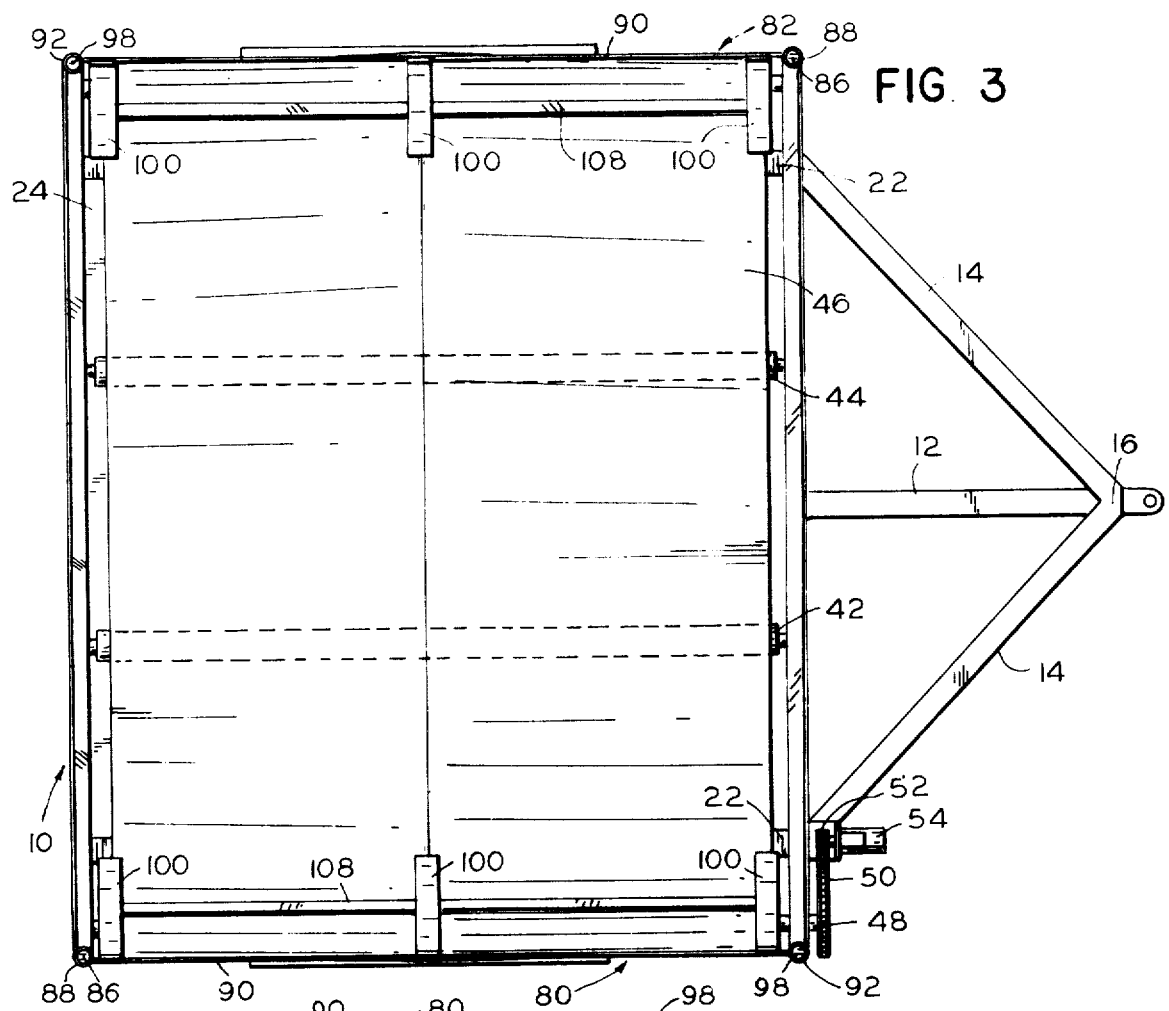
FIG. 3 is a top view of the bale unroller according to the present invention.

Referring to the drawings and particularly to FIGS. 1-3, the apparatus according to the present invention comprises a frame generally indicated at 10. The frame includes a central beam 12 and two angularly disposed side members 14, all formed from rectangular steel tubing, which are joined together as by welding at 16 to form a tongue portion. The tongue portion is provided with upper and lower plates 18 and 20, apertured to receive a pin therethrough employed for connecting the apparatus to a towing vehicle. The frame further includes a pair of channel shaped side members 22 disposed in parallel relation to beam 12 and welded to the angular members 14, while being joined at their remote ends to a channel 24 forming a rear portion of the frame. Channel 24 is also joined to the aforementioned central beam 12.

The frame in the illustrated embodiment further includes end plates comprising front and rear plates 26 and 28. Plate 26 is welded along its lower edge to the respective members 22 and 12, while rear plate 28 is suitably joined as by welding to channel 24. Angularly disposed bars 30 extend between the front and rear plates toward the lower sides of the structure and are suitably slanted upwardly toward their outside edges. The front and rear plates have outwardly extending upper lips, numbered 32 and 34 respectively, which act as guides for the reception of a bale 35 therebetween, and also structurally reinforce the frame. As will hereinafter more clearly appear, the lips also provide means for the attachment of side gates to the apparatus.

Between the front and rear plates 26 and 28 are disposed a plurality of rollers including a pair of parallel outside rollers 36 and 38 supported for rotation between end plate mounted bearings 40, and a second and smaller pair of rollers, 42 and 44, supported between a similar pair of end plate mounted bearings but rotatable about axes which are lower than the axes of rollers 36 and 38. A rubber conveyor belt 46 forms the under member or floor in the frame and extends around all of the aforementioned rollers in a continuous loop. The outside roller 36 is located proximate the left hand side of the apparatus, viewing the same from the tongue end, thus locating the exit end of the conveyor above and outwardly from a side member 22. The smaller rollers 42 and 44 are disposed equidistantly on either side of the center line of the device, i.e.

on either side of central beam 12, and the bale 36 tends to produce a concave depression of the belt along the path of the rollers as the weight of the bale is supported on the conveyor belt and substantially between and upon the rollers 42 and 44. This depression tends to hold the bale for rotation while inhibiting sideways movement, i.e. translation of the bale.

The central shaft of roller 36 extends through a bearing 40 mounted on plate 26, where such shaft is provided with a sprocket 48 driven by a chain 50 further extending around a sprocket 52 secured to the drive shaft of a hydraulic motor 54. Motor 54 is mounted upon one of the frame side members 14 and suitably comprises a hydraulic motor, driven, via means not shown, from hydraulic pumping means located on a tractor or other towing vehicle. The central shaft of rollers 38 extends through a slot 66 in front end plate 26 where the same is secured to the belt tightener generally indicated at 68. This belt tightener suitably comprises a central threaded rod 70 which is received through an aperture in a bracket 72 secured at right angles to end plate 26, the threaded rod receiving a nut 74 on the opposite side of the bracket from the aforementioned slot 66. The rod carries a bearing means 76, at the opposite end of the rod, which bearing means rotatably receives the shaft of roller 38. A spring 78 is received around the rod 70 between bracket 72 and bearing means 76 and is normally compressed therebetween for urging bearing means 76 to the right, as the apparatus is viewed in FIG. 2, for thereby applying tension to the belt. A similar belt tensioning means is located at the rear of the device, i.e. on plate 28 for applying tension to the shaft at the rear end of roller 38.

Figure 5:
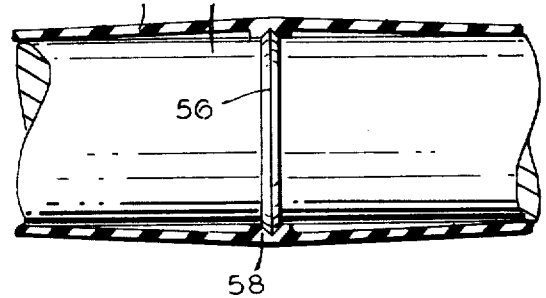
FIG. 5 is a detailed view, partially broken away and showing a conveyor belt according to the present invention in cross section, illustrating means for guiding the conveyor belt to prevent travel or slippage of the conveyor belt.

At least the outside rollers 36 and 38 are provided with a central guide rib 56, as illustrated in FIG. 5, mating with a guide rib or channel 58 formed at the longitudinal interior center line of conveyor belt 46. These mating guide ribs are employed for the purpose of preventing travel or slippage of the conveyor belt with respect to the rollers over which it travels.

Although the frame of the present invention is suitably mounted upon another vehicle, such as a trailer, truck body or the like, the apparatus is suitably made self-contained by the provision of side wheel 60 mounted upon an axle 62 which is in turn supported from leaf springs 64 secured to members 22. In the event the frame is mounted upon another vehicle, it will be apparent that the forward portion of the frame including the forward part of beam 12 and angularly disposed side members 14 may be replaced by a forward beam or channel parallel to the channel 24 at the rear portion of the frame.

Figure 4:
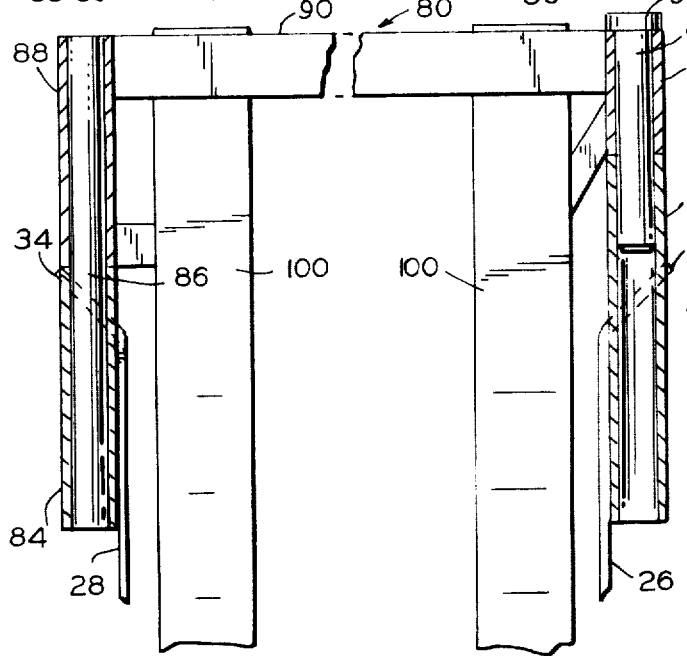
FIG. 4 is a fragmentary side view of a side gate of the bale unroller according to the present invention.

The apparatus according to the present invention is further provided with a pair of gates 80 and 82 disposed at the sides of the apparatus between front and rear plates 26 and 28. Referring particularly to FIG. 4, which illustrates gate 80 in fragmentary fashion, a vertical tube or stanchion 84 is secured to end plate 28 including lip 34 thereof and receives a vertical pin 86 secured therewithin and extending upwardly therefrom into a mating tube 88. Tube 88 is rotatable about the pin and is welded to horizontal bar 90 of the gate. Bar 90 extends across the side of the apparatus where it is secured to a second and shorter tubular member 92 which is vertically disposed for receiving a pin 94. Pin 94 extends downwardly into a tube or stanchion 96 secured to end plate 26 including the lip 32 of the latter.

Pin 94 is provided with a head 98 preventing loss of the same and facilitating removal thereof when the gate is to be opened. With pin 94 removed, the gate may be swung outwardly around the axis of pin 86.

The gate 80 also comprises a plurality of arcuate shaped, strap-like, steel restraining members 100 which suitably curve inwardly toward the underside of the bale 35 in spaced relation to the exterior of the bale to a point 102 spaced above the exit end of the conveyor belt 46. The intervening distance between the restraining member and the conveyor permits the unrolling of a band of hay 104 beneath the restraining member. The end of each restraining member is also suitably bent outwardly as indicated at 106. The restraining members form a rake-like structure which prevents translation of bale 35 as a whole when the top run of the conveyor belt 46 is translating from right to left as viewed in FIG. 2. The gate further comprises a cross bar support 108 joining the restraining members 100 between bar 90 and the lower extremity of members 100.

Gate 82 has substantially the same construction as gate 80, but comprises a "mirror image" thereof. It will be seen that gate 82 likewise prevents the bale 36 from moving or rolling to the right in FIG. 2.

Considering operation of the present invention, a rolled substantially cylindrical bale of hay, which may weigh, for example, between 1500 and 3000 pounds, is loaded into the present apparatus by means of a fork lift or similar device. For this purpose one of the gates, 80 or 82, may be swung open or removed, and replaced after the bale is located in place. It will be seen the bale 35 is disposed with its longitudinal axis located horizontally, i.e. parallel to the longitudinal center line of the present apparatus, with the weight of the bale sustained by the conveyor belt 46 and the rollers underneath. The conveyor belt 46 is advantageously approximately as wide as the bale 35 is long, so that at least the major portion of the bale will rest upon the conveyor belt and not upon the rollers underneath. When the apparatus is operated, as hereinafter described, the hay would be lost between supporting rollers, and under the apparatus, if the bale were to be positioned and rotated on rollers alone.

The hydraulic motor 54 is operated to cause the upper side of the conveyor belt to move in the direction indicated by the arrow in FIG. 2 such that a band of hay 104 is distributed toward the ground as the apparatus is towed at the tongue portion thereof. Since the bale was rolled in forming the same, it is efficaciously unrolled in the manner indicated, and the compacted rolled hay breaks off as it reaches the exit end of the conveyor 46, producing a narrow swath of hay 110 along the side of the apparatus as the same is towed to the right as viewed in FIG. 1. Alternatively, the conveyor may be operated with the apparatus in place, for piling up hay, or filling a trough, feed bunk or the like. However, in western ranch country it is desired to scatter the hay to leave rations for cattle at extended locations or along an extended path. Therefore, the present invention is particularly advantageous in rapidly distributing the rolled bale in this manner.

Although distribution of hay from the left side of the device is herein illustrated, it is clear the belt may be rotated in the opposite direction for unrolling the bale onto the ground at the right side of the apparatus. The direction, while a matter of choice, will be in accordance with the placement of the bale in the apparatus in the first place, so that the bale can unroll in the reverse sense to the direction it was originally rolled.

While I have shown and described a preferred embodiment of my invention, it will be apparent to those skilled in the art that many changes and modifications may be made without departing from my invention in its broader aspects. I, therefore, intend the appended claims to cover all such changes and modifications as fall within the true spirit and scope of my invention.

I claim:

1. Apparatus for distributing a rolled, substantially cylindrical hay bale comprising:

a frame for receiving said bale so that said bale is in an axis horizontal position, said frame being adapted for transport over the ground, and an under member supported by said frame for sustaining the weight of said bale, said under member comprising a conveyor belt supporting the side of said bale and having a width approximately as long as the length of said bale, said conveyor belt having a concave cross section where said bale is supported, said frame locating an exit portion of said conveyor belt near a side of said frame for depositing portions of said bale on a ground surface or in a container as said conveyor belt rotates said bale to unwind said bale, wherein said frame includes a retaining portion disposed above the exit portion of said conveyor belt in spaced relation thereto for permitting the exit of said bale between said retaining portion and said belt as said bale unwinds, said retaining portion preventing translation of said bale as a whole along said conveyor.

2. The apparatus according to claim 1 wherein said frame is provided with at least a pair of retaining portions located to receive said bale therebetween.

3. The apparatus according to claim 1 wherein said retaining portion of said frame comprises a gate hingedly supported by said frame proximate a corner of said frame for rotation about a vertical axis, and means for latching said gate to said frame proximate a corner of said frame on the opposite side of the exit portion of said conveyor belt.

4. The apparatus according to claim 3 wherein said gate is located with a portion extending inwardly from the said side of said frame, toward the position of the underside of said bale, and having a lower edge angled outwardly from the lower end of said gate and under which said bale is unwound.

5. Apparatus for distributing a rolled, substantially cylindrical hay bale comprising:

a frame for receiving said bale so that said bale is in an axis horizontal position, said frame being adapted for transport over the ground, and an under member supported by said frame for sustaining the weight of said bale, said under member comprising a conveyor belt supporting the side of said bale and having a width approximately as long as the length of said bale, said conveyor belt having a concave cross section where said bale is supported, said frame locating an exit portion of said conveyor belt near a side of said frame for depositing portions of said bale on a ground surface or in a container as said conveyor belt rotates said bale to unwind said bale, wherein said conveyor belt is supported by said frame by means of at least a pair of rollers located underneath the top surface of said conveyor belt between bearing means secured to said frame on opposite sides of said conveyor belt, and wherein said conveyor belt comprises a continuous loop runing around and between said pair of said rollers, said rollers of said pair being disposed proximate opposite sides of said frame.

6. The apparatus according to claim 5 further including sprocket drive means for driving one of the pair of rollers, and a belt tightening means for urging a second of said pair of rollers away from the first of said pair of rollers.

7. The apparatus according to claim 5 wherein at least said pair of rollers are provided with guide ribs mating with a guide rib on the inside of said belt for inhibiting movement of said belt along said rollers.

8. The apparatus according to claim 5 including further rollers located between said pair of rollers, and wherein the axes of the further rollers are vertically positioned to provide said concave cross section proximate where said bale is supported.

9. The apparatus according to claim 8 wherein said further rollers comprise a second pair of rollers, one located on each side of the position of the axial center line of said bale.

10. The apparatus according to claim 1 wherein said frame is provided with a towing tongue extending centrally forward from said frame in a direction parallel to said side of said frame, and wherein said frame is further provided with a pair of wheels attached to said frame and located under respective sides of said frame.

* * * * *